US006973257B1

(12) United States Patent
Park et al.

(10) Patent No.: US 6,973,257 B1
(45) Date of Patent: Dec. 6, 2005

(54) METHOD FOR INDEXING AND SEARCHING MOVING PICTURE USING MOTION ACTIVITY DESCRIPTION METHOD

(75) Inventors: Cheol-Soo Park, Suwon-shi (KR); Jong-Deuk Kim, Seoul (KR); Nam-Kyu Kim, Seoul (KR); Hae-Kwang Kim, Seoul (KR)

(73) Assignee: Hyundai Electronics Industries, Kyonggi-do (KR)

( * ) Notice: Subject to any disclaimer, the term of this patent is extended or adjusted under 35 U.S.C. 154(b) by 1079 days.

(21) Appl. No.: 09/610,811

(22) Filed: Jul. 6, 2000

(30) Foreign Application Priority Data

Jul. 8, 1999 (KR) .................................. 99-27555

(51) Int. Cl.[7] ............................................ H04N 5/783
(52) U.S. Cl. ............................ 386/69; 386/70; 707/3; 360/72.1
(58) Field of Search ............................ 386/45, 68, 69, 386/70, 125, 126; 707/1–3, 101, 102; 360/72.1, 360/72.2; H04N 5/781, 5/76, 7/783

(56) References Cited

U.S. PATENT DOCUMENTS

| 5,657,415 | A | * | 8/1997 | Yamada | ........................ 386/69 |
| 5,982,979 | A | * | 11/1999 | Omata et al. | .................. 386/69 |
| 6,360,234 | B2 | * | 3/2002 | Jain et al. | ................. 715/500.1 |
| 2001/0026678 | A1 | * | 10/2001 | Nagasaka et al. | ............. 386/70 |

OTHER PUBLICATIONS

Schonfeld, Dan, "VORTEX: Video Retrieval and Tracking from Compressed Mutimedia Databases," IEEE, 1998, XP-001044402, pp. 12327.

* cited by examiner

*Primary Examiner*—Thai Tran
(74) *Attorney, Agent, or Firm*—R. Neil Sudol; Henry D. Coleman; William J. Sapone

(57) ABSTRACT

A method for indexing and searching a moving picture using a motion activity description method is disclosed, which includes a step for describing a motion feature information based on a f_code which is a size of a video name, a time stamp and a motion search, and a step for indexing and searching a moving picture using the same, for thereby describing a feature with respect to a motion activity using an information existing in a compressed data when searching a moving picture.

31 Claims, 8 Drawing Sheets

METHOD FOR INDEXING AND SEARCHING MOVING PICTURE USING MOTION ACTIVITY DESCRIPTION METHOD

BACKGROUND OF THE INVENTION

1. Field of the Invention

The present invention relates to a method for indexing and searching a motion activity description method, and in particular to a method for indexing and searching a moving picture using a motion activity description method which is capable of describing a motion activity using an information of a compressed data when searching a moving picture based on a motion.

2. Description of the Background Art

Recently, as an expression media (character, graphic, voice, audio and video), a transfer media (communication network, broadcasting network and storage media) and a system operation using the same are continuously advanced, the needs for effectively generating and searching a large capacity multimedia data formed of a plurality of mono media is increased compared to a mono media formed of a small capacity media. As the needs for generating an extended multimedia data is satisfied based on an electronically processed expression media, a large amount of mono media or multimedia data are provided for a personal use or a system use.

However, the time and cost required for searching data are increased in proportion to the amount of the multimedia data. Therefore, in order to implement a fast and effective data search, a text-based search technique is widely used. In addition, a certain technique which is proper for an effective multimedia data search having a combined information attribute is required.

In order to implement an effective multimedia data search, a compactness of a side of an information attribute for expressing a feature of each media data, a simplification of a pre-process used for a feature extraction, an effectiveness of an information attribute, a diversity of the same, and an accurate similarity search are required. Therefore, it is known that an effectiveness and diversity of a search result as well as a subjective similarity is an important factor for evaluating a performance of a search. Major differences of a feature based search and a multimedia data based search are a difficulty of an information attribute extraction and technique and a diversity of an expression. In view of a difficulty of an information attribute extraction, a certain number of key words and feature of a document are indexed in case of a character data thereby implementing a search operation. In the case of the multimedia, since the data size is large, and various media are mixed, a proper pre-process should be performed for obtaining a feature which is a representative of the information attribute and has an organic relationship.

In view of a video search as one example of a diversity of the information attribute, since the video is mixed with various media such as video, voice, audio, etc., when expressing the feature of video, a certain pre-process should be performed with respect to an information attribute of a multimedia data in which more than two media are mixed for thereby implementing a more effective search.

The field which is currently being under the development is a content based still image search in which a data is easily extracted. The above-described still image is widely used a storage system such as an electronic type still camera of a digital type and a video database, a still image transmission apparatus, a transmission system such as an audio graphic conference and a video conference, and a printing system such as a color printer. The content-based still image search is directed to extracting a feature information which is an invariant feature for a rotation, size and translation with respect to a color, texture, shape information of an image and is used for an effective search.

In the moving picture search, a structuring operation is performed with respect to a moving picture using a color, texture, shape and motion information between the videos based on a shot and scene which are a proper content- or time-based interval, and a certain number of key frames is selected for representing the segment. In addition, a feature information is extracted with respect to a color, texture, shape and motion for the thusly extracted key frame, so that a moving picture search is performed by a method which is same to or similar to the method of the still image search. In the moving picture search, it is not easy to obtain the data compared to the still picture. In the moving picture search, since a large amount of the data is processed, there is a certain limit for various applications. However, the above-described techniques are intensively studied as a storage media and communication media such as a disk, tape, and CD-ROM are developed.

The moving picture search will be explained in detail.

The moving picture is defined with respect to a series frame having a certain sequence obtained based on a continued time. In addition, a redundancy between the neighboring frame is large, so that it is possible to conduct a prediction between the frames. The moving frame feature is different from the still video due to the above-described redundancy which is effectively used for the moving picture search. The redundancy may be expressed using a motion activity between the frames. If the redundancy is large, it means that the overlapped region (the same region—object) between the neighboring frames is large, and it means that the motion activity between the frames is small. On the contrary, in the case that the applicable range is small between the images, since the overlapped images between the neighboring images are small, it means that the motion region is small. Recently, a new moving picture compression technique uses an inter-frame coding technique using a redundancy between the frames for enhancing a data compression efficiency (H.261, H.263, MPEG-1, MPEG-2, MPEG-4).

In most cases, the moving picture data is stored in a compressed format due to its large size, using a moving picture compression technique. Therefore, in view of a feature extraction which is used for a search, it is possible to decrease cost by extracting a feature using an information existing in the compressed data. There has been active study on the above-described technique. However, in case where a feature is extracted from the compressed moving picture data, a problem rises in that a variable feature information is extracted in accordance with a change in coding parameter. For example, the size of the motion vector may vary according to the difference of a motion prediction region with respect to the same moving picture.

This can be explained in more detail with reference to the general coding method of moving picture.

As described above, general moving picture coding standard utilizes an inter-frame coding technique using a motion prediction and is classified into an intra picture (I picture) coded in accordance with an inter-frame coding technique performed for each image, a predictive picture (P picture) coded by performing a forward prediction, and a bidirectional picture (B picture) coded by a bidirectional prediction.

In the I picture, a predictive coding method between the images is not used with respect to the signals in the image, and an image signal in a macro block (image signal in a region of 16×16 pixels) is divided into a block unit of 8×8, and a spatial redundancy is minimized using a DCT, and the data are compressed by performing a quantization and variable length coding method with respect to a DCT coefficient. In the compression information of the I picture, an information of an transformed value (DCT coefficient) is stored with respect to the video signal.

In the P picture, the prediction is performed in the forward direction using a BMA (block Matching algorithm) of the macro block unit, to thereby estimate a motion vector and perform a motion compensation. During the block matching operation, the size of motion estimation is defined based on a f-code which represents a motion estimation region, and a faster motion may be compensated as the value of the f-code is increased. In addition, difference (compensation error) between the image having the size of the compensated macro block and the image of the macro block of the macro block images to be coded is compressed by a discrete cosine transformation (DCT), a quantization and a variable length coding operation in the same manner as the I picture. Therefore, in the compressed information of the P picture, an information concerning the motion vector and the compensation error is stored.

In the B picture, a prediction between the forward and backward directions is performed using a block matching method of the macro block unit thereby estimating a motion vector and compensating the motion. When coding with the image of the compensated macro block size, an information concerning a motion vector and a compensation error are is stored in a compression information of the I picture with respect to the difference (compensation error) of the macro block images. The structures (sequence) of the I, P and B pictures may be variably constructed as follows in accordance with an encoding environment and applicable field. Generally, a picture structure such as IBPBPBP . . . , IBBPBBP . . . , and III . . . In addition thereto, various combinations may be adapted.

In the method for describing a feature with respect to the motion activity, the inter picture motion vector is obtained irrespective of a storing format of a moving picture, and an average, distribution and standard variation or a histogram thereof may be used as a feature information.

However, the above-described methods are disadvantageous in that a large amount of motion information should be stored for a certain period of time. In addition, in case of the compressed moving picture, a feature which may vary according to a change in an encoding parameters with respect to the same moving pictures.

In addition, there is a method where no change occurs in a compressed data, and an entire ratio with respect to the position and region same as those of the previous images is employed. In this method, a cost is significantly reduced for extracting the features as compared to the above-described method. However, this method has drawbacks in that it may not reflect a motion feature of a human, and a feature which varies according to an encoding environment is extracted similarly to the above-described methods.

SUMMARY OF THE INVENTION

Accordingly, it is an object of the present invention to provided a method for indexing and searching a moving picture using a motion activity description method which is capable of describing a feature with respect to a motion activity using an information existing in a compressed data when searching a moving picture.

To achieve the above objects, a first embodiment of the present invention is directed to describing a motion activity information based on a video name, a time stamp and a f_code which is the size of a motion estimation region.

To achieve the above objects, a second embodiment of the present invention is directed to describing a motion feature information in terms of a video name, a time stamp and a frequency of an Inter mode of No_MC, a frequency of an Intra mode of no_MC, a frequency of an MC mode and a frequency of an MC mode, and indexing and searching a moving picture using such a motion feature information.

To achieve the above objects, the second embodiment of the present invention is directed to describing a motion feature information in terms of a video name, a time stamp and a frequency of an Inter mode of No_MC, and indexing and searching a moving picture using such a motion feature information.

To achieve the above objects, the second embodiment of the present invention is directed to describing a motion feature information in terms of a video name, a time stamp and a frequency of an Intra mode of no_MC, and indexing and searching a moving picture using such a motion feature information.

To achieve the above objects, a second embodiment of the present invention is directed to describing a motion feature information in terms of a video name, a time stamp and a frequency of an MC mode, and indexing and searching a moving picture using such a motion feature information. To achieve the above objects, a third embodiment of the present invention is directed to describing a feature information in terms of a video name, a time stamp and a frequency of an MC_Coded mode and a frequency of an MC_Not_Coded mode, and indexing and searching a moving picture using such a motion picture information.

To achieve the above objects, a third embodiment of the present invention is directed to describing a feature information in terms of a video name, a time stamp and a frequency of an MC_Coded mode and a frequency of an MC_Not_Coded mode, and comparing a frequency of an MC_Coded mode of a moving picture having smaller f_code with a frequency of an MC_Coded mode of a moving picture having larger f_code or a frequency of MC_Not_Coded mode, with respect to moving pictures having different f_codes, thereby measuring a similarity.

To achieve the above objects, a fourth embodiment of the present invention is directed to describing a motion feature information in terms of a video name, a time stamp and a frequency of an Inter mode of No_MC, a frequency of an Intra mode of No_MC, a frequency of a MC mode, a frequency of a Coded mode and Not_coded mode with respect to the MC mode of the MB_Mode, and indexing and searching a moving picture using such a motion feature information.

To achieve the above objects, a fifth embodiment of the present invention is directed to describing a motion feature information in terms of a video name, a time stamp and f_code frequency in which a motion vector of a macro block having an MC_Not_Coded mode, MC_coded mode and No_MC_Inter mode is classified according to f_code, and comparing each f_code frequency, thereby measuring a similarity.

To achieve the above objects, the fifth embodiment of the present invention is directed to describing a motion feature information in terms of a video name, a time stamp and f_code frequency in which a motion vector of a macro block having an MC_Not_Coded mode, MC_coded mode and No_MC_Inter mode is classified according to f_code, and comparing frequency of f_code frequency with that of adjacent at least one f_code, thereby measuring a similarity.

To achieve the above objects, the fifth embodiment of the present invention is directed to describing a motion feature information in terms of a video name, a time stamp and f_code frequency in which a motion vector of a macro block having an MC_Not_Coded mode, MC_coded mode and No_MC_Inter mode is classified according to f_code, and comparing frequency of f_code frequency with that of adjacent at least one f_code, thereby measuring a similarity. Here, as the motion vector becomes closer to the maximum value and the minimum value of a vector scope expressed by each f_code, and as the motion compensation error is larger, the similarity becomes higher. A weight value is added to the frequency of f_code larger than a predetermined f_code, so as to perform indexing and searching with respect to a moving picture.

To achieve the above objects, a sixth embodiment of the present invention is directed to describing a motion feature information in terms of a video name, a time stamp and a frequency of an MB with respect to an Inter mode of No_MC and an Intra mode of an No_MC, and indexing and searching a moving picture using such a motion picture information.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The embodiments of the present invention will be explained with reference to the accompanying drawings.

Figure 1:
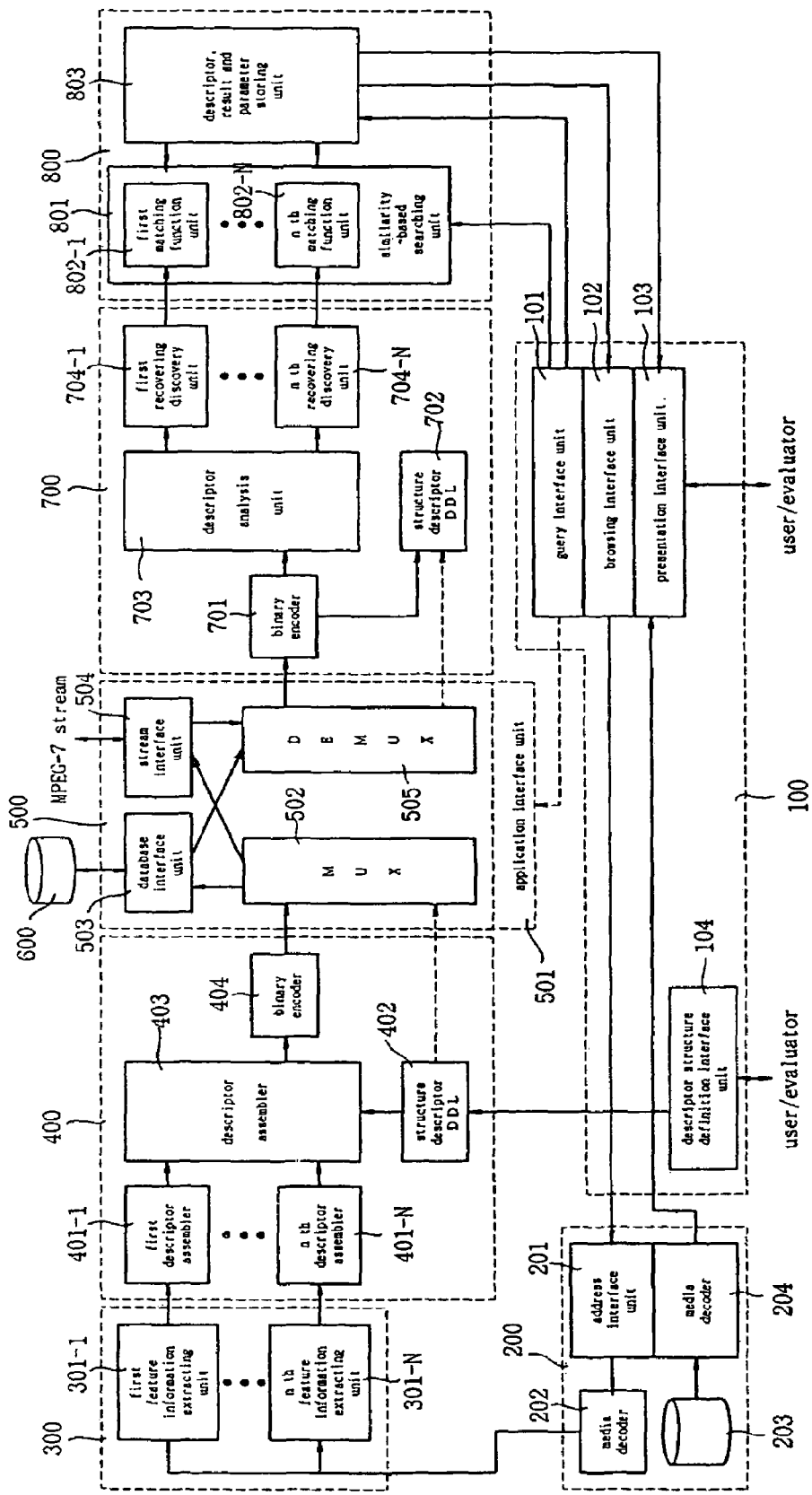
FIG. 1 is a block diagram illustrating a multimedia index and search apparatus for a MPEG-7 system according to the present invention.

FIG. 1 is a block diagram illustrating a multimedia indexing/searching apparatus for a MPEG-7 system according to the present invention.

As shown therein, the multimedia indexing/searching apparatus for a MPEG-7 according to the present invention includes a user interface unit 100, an AV media interface unit 200, an AV media interface unit 200, a feature information extracting unit 300, a MPEG-7 encoder 400, a feature information interface unit 500, a MPEG-7 decoder 700 and a search unit 800.

The user interface unit 100 includes a query interface unit 101, a browsing interface unit 102, a presentation interface unit 103, and a descriptor structure definition interface unit 104 for thereby implementing an interface with a user and evaluator.

The AV media interface unit 200 includes an address interface unit 201, a media decoder 202, a database 203, and a media decoder 204. The browsing interface unit 102 of the user interface unit 100 decodes a media of an interface data or decodes a media stored in the database 203 and provides the decoded data to the presentation interface unit 103 of the user interface unit 100.

Namely, the address interface unit 201 of the AV media interface unit 200 interfaces a browsing address interfaced by the browsing interface unit 102 of the user interface unit 100, and the media decoder 202 decodes the browsing having an address interfaced by the address interface unit 201.

The media decoder 204 decodes a media stored in the database 203.

The feature information extracting unit 300 includes first through N-th feature information extracting units 301-1 through 300-N and extracts a feature information from the media decoded by the media decoder 202 of the AV media interface unit 200.

The MPEG-7 encoder 400 encodes the 1st through N-th feature information extracted by the feature information extracting unit 300.

The 1st through N-th descriptor assemblers 401-1 through 401-N of the MPEG-7 encoder describe the 1st through N-th feature information extracted by the 1st through N-th feature information extracting units 301-1 through 301-N of the feature information extracting unit 300.

The structure descriptor definition language (DDL) 402 describes the descriptor structure definition interfaced by the descriptor structure definition interface unit 104 of the user interface unit 100. and the descriptor assembler 403 describes the 1st through N-th feature information described in the 1st through N-th description assemblers 401-1 through 401-N based on the descriptor described by the structure descriptor DDL 402. A binary encoder 404 encodes a feature information described in the descriptor assembler 403.

The feature information interface unit 500 stores the data encoded by the MPEG-7 encoder 400 into the database 600 or outputs in the MPEG-7 stream or extracts the data stored in the database 600 and interfaces the input MPEG-7 stream.

In detail, the multiplexor 502 multiplexes a feature information encoded by the binary encoder 404 of the MPEG-7 encoder 400. The database interface unit 503 interfaces a feature information multiplexed by the multiplexor 502 and stores into the MPEG-7 database 600 and interfaces a feature information stored in the MPEG-7 database 600.

The stream interface 504 interfaces a feature information multiplexed by the multiplexor 502 and outputs in a MPEG-7 stream or interfaces the input MPEG-7 stream. The demultiplexor 505 demultiplexes a feature information interfaced by the database interface unit 503 or a feature information interfaced by the stream interface unit 504.

The MPEG-7 decoder 700 decodes a data outputted from the feature information interface unit 500.

The binary decoder 701 of the MPEG-7 decoder 700 decodes a feature information demultiplexed by the demultiplexor 505 of the feature information interface, and the descriptor language 702 describes a structure of the feature information decoded by the binary decoder 701. The descriptor analysis unit 703 analysis a description which corresponds to the feature information decoded by the binary decoder 701. The 1st through N-th descriptor recovering units 704-1 through 704-N recover the descriptors analyzed by the descriptor analysis unit 703.

The search unit 800 performs a search using a feature information decoded by the MPEG-7 decoder 700.

Namely, the similarity-based searching unit 801 of the search unit 800 is formed of first matching function units 802-1 through 802-N and performs a search operation using a feature information described by the first through N-th descriptor values recovered by the 1st through N-th descriptor recovering units 704 of the MPEG-7 decoder 700. The descriptor, result, and parameter storing nit 803 stores a descriptor, search result and parameter used for the similarity-based searching unit 801.

Since the database of the known information search system stores a large amount of multimedia contents, a data compression is performed in order to enhance a storing efficiency. In this case, in the search system includes a multimedia decoder for a feature information extraction and browsing operation with respect to the compressed contents except for the construction of FIG. 1. JPEG, GIF, and TIFF may be used for the still picture, and MPEG1, MPEG2, MPEG4, H.261 and H263 may be used for the moving picture.

In the present invention, as a process for extracting the feature information with respect to the compressed data based on a storing and transmission condition, two methods are known. The first method is a method for recovering a compressed data and extracting a feature information, and the second method is a method for extracting a feature information using an information existing in the compressed data.

The first method has a problem in that a long time and a certain storing space are required for recovering the compressed data. However, there is an advantage in that a feature information may be accurately extracted with respect to the recovered data. The second method has an advantage in that it is possible to extract a feature information in real time using small storing space. However, in this method, there is a problem in that the information existing in the stream may be different based on a compression method and compression degree. In the system which is designed to extract a feature information with respect to a large size multimedia content, a real time process is required. Therefore, it may be used for the application which needs a real time process.

Figure 2:
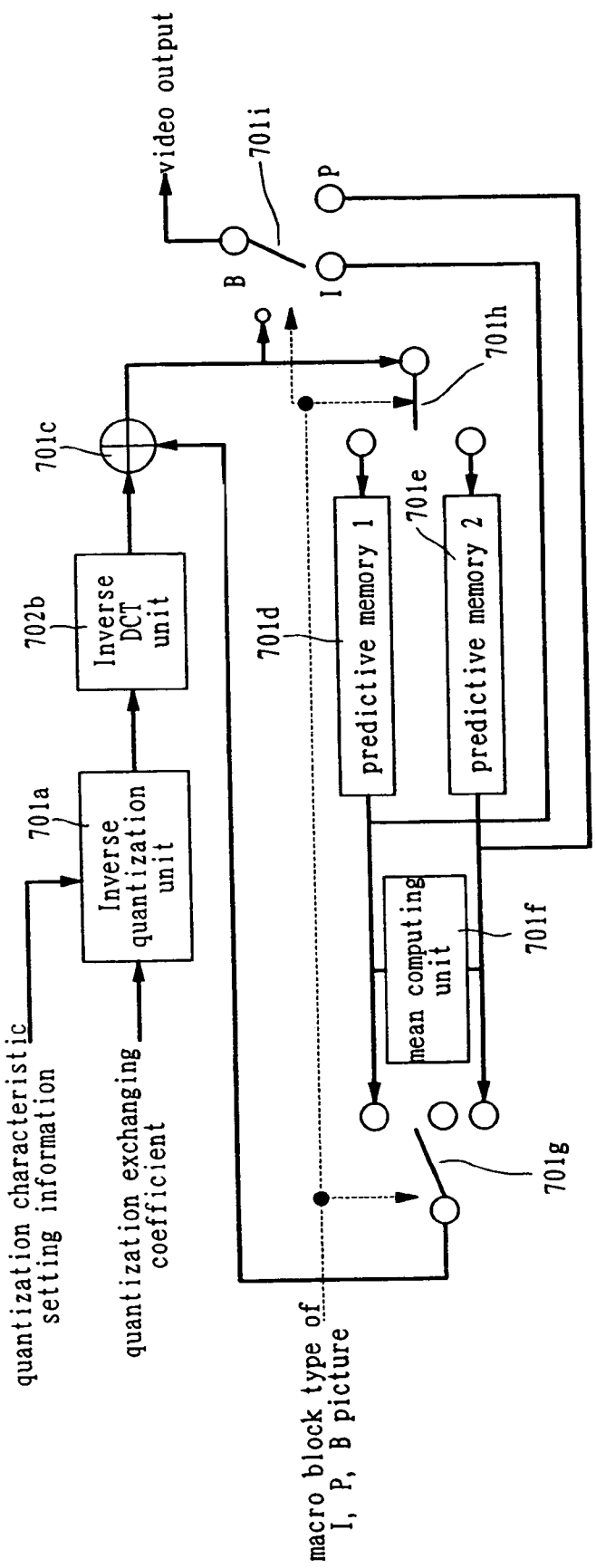
FIG. 2 is a detail block diagram illustrating a video decoder for a MPEG-7 decoder of FIG. 1.

FIG. 2 is a block diagram illustrating a binary decoder 701 of a MPEG-7 decoder 700 of FIG. 1.

As shown therein, the binary decoder 701 of the MPEG-7 decoder 700 includes an inverse quantization unit 701a, an inverse DCT unit 701b, a switching unit 701g, a summing unit 701c, a switching unit 701h and switching unit 701i.

The inverse quantization unit inversely quantizes a quantizing characteristic destination information based on a quantizing conversion coefficient. The inverse DCT unit 701b processes the feature information which is inversely quantized by the inverse quantization unit 701a. The summing unit 701c sums a feature information which is processed by the inverse DCT unit and the outputs pictures from a predictive memory 1(701d) and a predictive memory 2(701e) or an average computation unit 701f inputted via the switching unit 701g.

The switching unit 701h is switched in accordance with a macro block type of the I, P, and B pictures and selectively outputs an output picture of the summing unit 701c to the predictive memory 1 (701d) or the predictive memory 2 (701e). The switching unit 701i is switches in accordance with a macro block type of the I, P and B pictures and selectively outputs the B picture of the summing unit 701c, the I and P pictures of the predictive memory 1 (701d) or the I and P pictures of the predictive memory 2 (701e).

In the present invention, a feature information is used with respect to the motion information of a video using a macro block type of the I, P and B pictures. Table 1 illustrates the classifications with respect to the macro block type.

Figure 3:
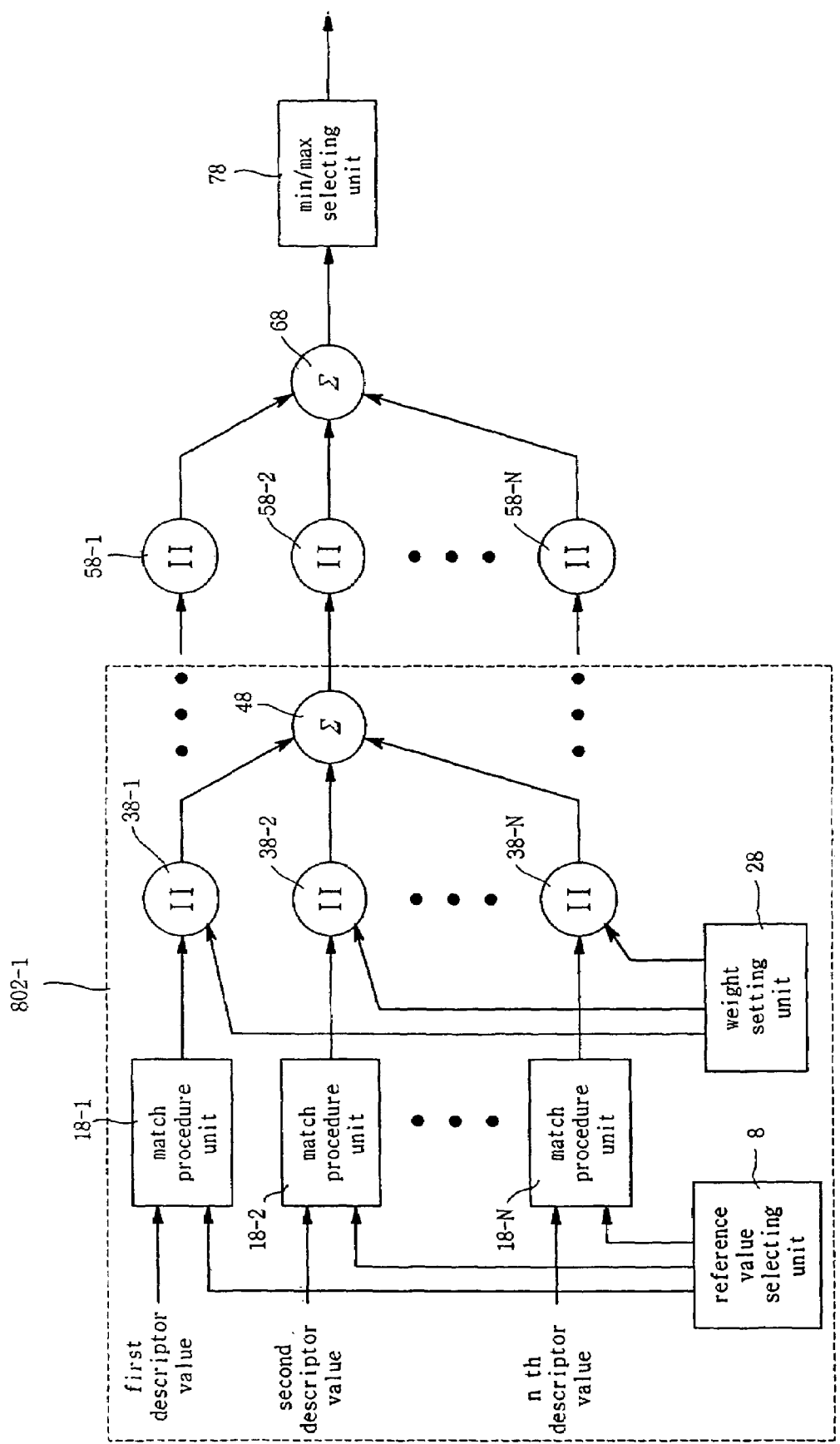
FIG. 3 is a detail block diagram illustrating a similarity based searching unit of FIG. 1.

FIG. 3 is a block diagram illustrating a similarity based searching unit 801 of the search unit 800 of FIG. 1.

As shown therein, the similarity based searching unit 801 of the search unit 800 includes 1st through N-th matching function units 802-1 through 802-N, 1st through N-th multipliers 58-1 through 58-N for computing a value summed by the summing unit 48 at the 1st through N-th matching function units 802-1 through 802-N and a set weight, a summing unit 68 for summing the multiplication values of the 1st through N-th multipliers 58-1 through 58-N, and a minimum/maximum selection unit 78 for selecting a minimum/maximum value among the summed values of the summing unit 68.

The 1st through N-th matching function units 802-1 through 802-N include 1st through N-th match performing units 18-1 through 18-N for predicting a similarity between the 1st through N-th description values and a reference value selected by the reference value selection unit 8, 1st through N-th multipliers 38-1 through 38-N for multiplying a similarity value predicted by the 1st through N-th match performing units 18-1 through 18-N and a weight set by the weight setting unit 28, and a summing unit 48 for summing the multiplied values of the 1st through N-th multipliers 38-1 through 38-N.

The thus constituted similarity based searching unit 801 performs a similarity based search operation like a character based information search system which is widely used on Internet or at a library for searching the multimedia contents. In the similarity based search, a similarity between a content inquired by a user and a feature information stored in the database is measured, and a weight is provided thereto for thereby measuring a similarity with respect to the entire portions.

The 1st through N-th match performing units 18-1 through 18-N are implemented by a SAD (Sum of Absolute Difference), MSE (Mean Square Error), Correlation, and Normalized correlation. In addition, the weight may be a value for reflecting a normalized factor used when a certain condition of a system user or operator or an expression unit between the feature information is different.

The motion activity describing method using a coding mode of a macro block based on a multimedia indexing and searching apparatus for a MPEG-7 system according to the present invention will be explained in detail.

In the present invention, a method for indexing and searching a robust video signal under a coding environment with respect to a compressed video signal is disclosed. Generally, a compressed video information may vary due to the degree of the compression and an applicable field. The common representative compression methods such as MPEG-1, MPEG-2, MPEG-4, H.261 and H.263 employs a rate control for controlling the ratio of the compression. As a factor for a rate control, a quantizing step size of a texture information coding unit is used.

Therefore, in the present invention, a motion information is considered to be robust with respect to a compression ratio. In addition, when coding by varying an image size with respect to the same contents, the size of the motion vector may be variable. In this case, it is possible to obtain a robust information by normalizing the motion vector into the size of the image. Therefore, feature information which is relatively adjacent to the estimated motion information may be obtained if a proper process is performed with respect to a motion information which exists in the compressed video, and then a motion feature information is extracted.

The present invention employs a rough motion feature information in the video using a coding mode with respect to a macro block which is used as an encoding unit for a moving picture compression technique. In this schematic information, the degree of the movement and the direction of the same may not be known. However, it is possible to enhance the speed of the search by decreasing the candidates to be searched in the earliest steps of the video search. In addition, in the case that a user which uses the search system knows a rough information with respect to a motion in the video, it may be applicably used. In addition, since only the coding mode is recovered, it may be applicable to a real time application.

The moving picture compression method (H.261, H.263, MPEG-1, MPEG-2 and MPEG-4) uses a hybrid inter-frame coding method which is implemented based on a motion prediction between the images for enhancing a compression performance. The unit of the coding operation is a macro block (MB) of a 16×16 pixel size. In the inter-frame motion estimation, a difference between the spatial position in which an image signal of a luminance is most similar in a search region of a previous image and the current MB becomes a motion vector with respect to a certain MB of the current image. Generally, the search region is indicated by a syntax called as f_code. The above-described values will be explained with reference to the following Table 1.

TABLE 1

| f-code | 1 | 2 | 3 | ... | N |
|---|---|---|---|---|---|
| search region size | 16 × 16 | 32 × 32 | 64 × 64 | ... | $2^{N+3} \times 2^{N+3}$ |
| vector range | (−16~15.5) | (−32~31.5) | (−64~63.5) | ... | ($-2^{N+3}$~$2^{N+3}$ −0.5) |

In addition, in the above-described compression standard, the coding mode a shown in Table 2 is used for an effective compression. Coding mode of the MB are shown therein. (There may be a small difference when expressing the syntax based on the standard).

TABLE 2

| MB mode | | |
|---|---|---|
| No_MC | Inter | Coded |
|  |  | Not Coded |
| MC |  | Coded |
|  |  | Not coded |

The MB_Mode may be classified into a MB (MC) which has a motion compensation and a MB (No_MC) which does not have a motion compensation. In the No_MC, there are an inter mode in which the data of the current MB is almost same as the signal of the same position of the previous image, namely, the X-axis motion vector mv_x is 0, and the Y-axis motion vector mv_y is 0 (mv_x=0, mv_y=0), and an Intra mode (hereinaftr called No_MC_Intra mode) in which it is impossible to locate the image signals larger than the MB in the defined similarity in the previous image for the defined f_code. The Intra mode is implemented when a motion is large or a new image or region is formed.

The Inter mode (No_Inter mode) of the No_MC is classified into a Coded (hereinafter called as a No_MC_Coded mode) and a Not_Coded mode (hereinafter called No_MC_Not_coded mode). The coded mode (skip mode) represents that the motion compensation is done based on the motion vector of (0, 0), and then is coded, so that a DCT coefficient obtained based on a DCT with respect to a difference signal (residual errors) between the current MB and the motion compensated MB is quantized and predicted. In this case, there is not a coefficient value for a coding operation, namely, the coefficient values which will be coded are 0. The Not_Coded mode represents that there are a coded coefficient value which is not 0. The MB having the Not_Coded mode is similarly same to the image signal of the same position of the previous image. It means a stopped state. The coded mode may be neglected.

The MC mode represents that a compensatable motion (namely, it is possible to search an image signal above the set similarity by searching the defined f_code) in which the motion vector is (0, 0) is made and has a Coded (hereinafter called MC_Coded mode) which is the same as the Inter mode of the No_MC and the Not_Coded (hereinafter called MC_Not_Coded mode) mode.

As shown therein, the MB_Mode includes an overall and compression meaning with respect to a motion activity (namely, an extendibility between images) of a moving picture. In the present invention, as an information for describing a feature of the motion, the MB_Mode is used. However, since the MB_Mode has a disadvantage in that a variable feature information is extracted based on a coding environment variation such as a f_code variation as shown in Table 1. In order to minimize the above-described problem, a motion activity describing method using a coding mode of a macro block according to the present invention will be explained.

First, a motion activity describing method using a coding mode of a macro block according to a first embodiment of the present invention will be explained.

The f_code indicating the size of a search of a motion which significantly affects an MC mode and No_MC mode decision at the MB_Mode, is used as a motion feature information. Generally, the f_code which is determined at the coder side is determined in a state that a statistical characteristic with respect to a motion activity of a moving picture for coding based on a coding efficiency and a reproduced image quality is recognized. Therefore, the f_code is an important factor for describing a feature with respect to a motion activity.

The range of the f_code which indicates the maximum/minimum expression size of the motion vector may vary in accordance with a motion image compression standard. However, in the f_code, as the f_code value is increased, a more large motion is expressed.

In the present invention, the f_code is used as a feature information of a motion of a video and is formed of a f_code value which corresponds to a video name, a time stamp and a motion feature. In addition, a plurality of time stamps and motion features may be provided with respect to the same video. Namely, at video_name-1 which is the list of the video name, video_name_N has the same name.

TABLE 3

| VIDEO NAME | TIME STAMP | MOTION FEATURE |
|---|---|---|
| video name 1 | start time 1, end time 1 | f_code_1 |
| ... | ... | ... |
| video name N | start time N, end time N | f_code_N |

As shown in Table 3, the motion feature information may express with respect to the images at a certain interval with respect to a sheet of image in the video and is directed to classifying whether the information corresponds to a feature information or a certain interval based on the time stamp.

Figure 4:
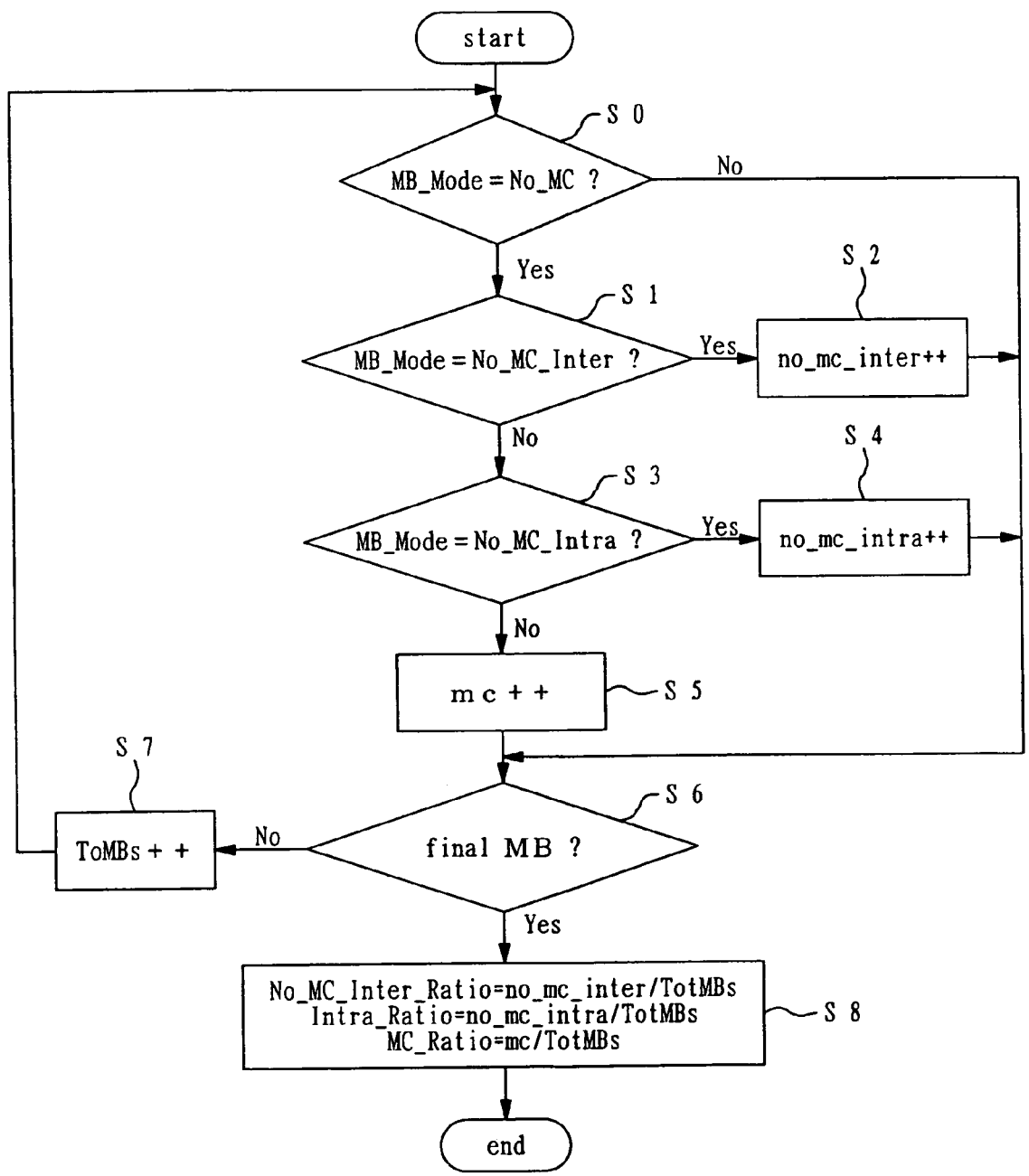
FIG. 4 is a flow chart illustrating a motion activity description method using a coding mode of a macro block according to a second embodiment of the present invention.

As shown in FIG. 4, the motion activity describing method using a coding mode of a macro block according to a second embodiment of the present invention will be explained.

In the MB_Mode, a frequency (No_MC_Inter_Ratio) of an Inter mode of an No_MC, a frequency of an Intra mode of he No_MC, and a frequency (MC-Ratio) with respect to the MC mode are used as a motion feature information.

As shown in FIG. 4, the process for obtaining the frequency (No_MC_Ratio) of the inter mode of the No_MC, the frequency (Intra_Ratio) of the Intra mode of the No_MC, and the frequency (MC_Ratio) with respect to the MC mode is directed to judging whether the MB_Mode is the No_MC_inter mode in Step S1.

As a result of the judgement of Step S1, if the MB_Mode is the No_MC_Inter mode, in Step S2, a counter corresponding to the no_mc_inter mode is increased. If the MB_Mode is not the No_MC_Inter mode, in Step S3, it is judged whether the MB_Mode is the No_MC_Intra mode.

As a result of the judgement of Step S3, in the case that the MB_Mode is the No_MC_Intra mode, in Step S4, a counter corresponding to the no_mc_intra mode is increased, and in the case that the MB_Mode is not the No_MC_Intra mode, a counter corresponding to the mc mode is increased. In Step S6, it is judged whether the MB is the last MB.

As a result of the judgement of Step S6, in the case that the MB is not the last MB, the steps S1 through S6 are repeatedly performed. In the case that the MB is the last MB, a frequency (No_MC_Inter_Ratio) of the Inter mode of the No_MC, a frequency (Intra_Ratio) of the Intra mode of the No_MC, and a frequency (MC_Ratio) with respect to the MC mode are obtained based on the following Equation 1 in Step S8.

[Equation 1]

$$No\_MC\_Inter\_Ratio = no\_mc\_inter/TotMBs$$

$$Intra\_Ratio = no\_mc\_intra/TotMBs$$

$$Mc\_Ratio = mc/TotMBs$$

where TotMBs represents the number of all macro blocks used for a motion extraction at an interval for obtaining a motion feature, and No_MC_Inter_Ratio represents a ratio of a region in which there is not a motion with respect to an image, Intra_Ratio represents a ratio of a region in which a motion compensation is impossible and a region which is not formed using a f_code because the motion is too large, and MC_Ratio represents a case that it is possible to recover from a previous image based on a motion compensation, namely, only a movement in a horizontal/vertical direction occurs.

Therefore, if the No_MC_Inter_Ratio is too large, the image is not moved, namely, there is not a movement. If the MC_Ratio is too large, it means that there is a lot amount of movements or a complicated movement. Namely, it means that a new object is introduced.

In the present invention, the motion activity is classified into three steps (no movement, a small movement, and a lot amount movement), and the ratios with respect there to are indexed, and a video search is performed using the same.

As shown in Table 4, the motion feature information of the video is formed of a video name, a time stamp, No_MC_Inter_Ratio, Intra_Ratio and MC_Ratio. In addition, a plurality of time stamps and motion feature information may be provided with respect to the same video. The video_name_N at the video_name_1 which is the list of the video name has the same names.

TABLE 4

| VIDEO NAME | TIME STAMP | MOTION FEATURE |
|---|---|---|
| video name_1 | start_time_1, end_time_1 | No_MC_Inter_Ratio_1, Intra_Ratio_1, MC_Ratio 1 |
| ... | ... | ... |
| video name_N | start_time_N, end_time_n | No_MC_Ratio_N, Intra_Ratio_N, MC_Ratio_N |

As shown in Table 4, the motion feature information may be expressed with respect to an image at a certain interval with respect to a sheet of an image in the video. Therefore, it is possible to check whether the information corresponds to a feature information with respect to a sheet of an image based on the time stamp or the entire information.

Figure 5:
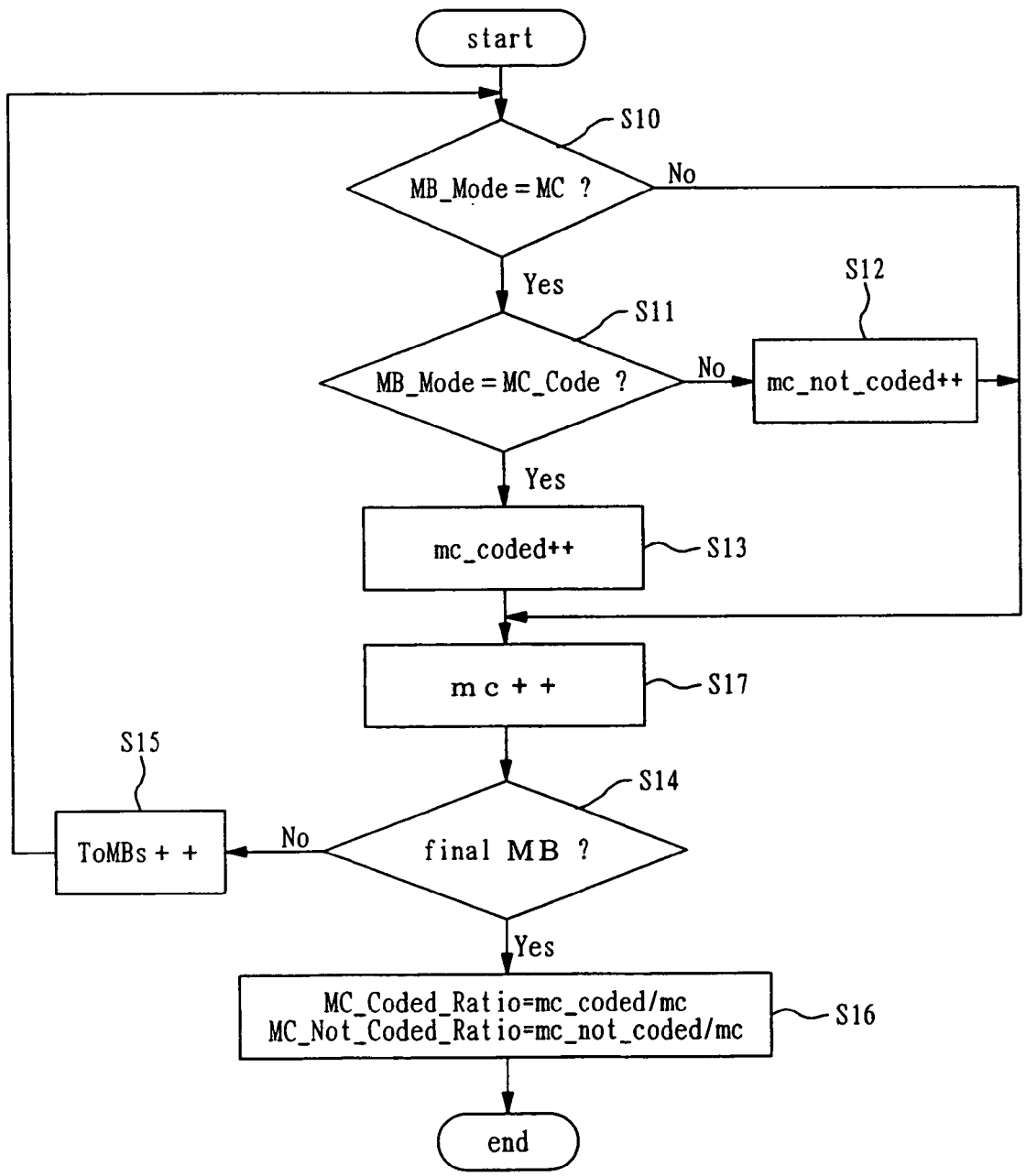
FIG. 5 is a flow chart illustrating a motion activity description method using a coding mode of a macro block according to a third embodiment of the present invention.

As shown in FIG. 5, a motion activity describing method using a coding mode of a macro block according to a third embodiment of the present invention will be explained.

A frequency (MC_Coded_Ratio) of a coded mode and a frequency (MC_Not_Coded_Ratio) of a Not_Coded mode are used as a motion feature information with respect to the MC mode of the MB_Mode.

As shown in FIG. 5, in Step S11, it is judged whether the MB_Mode is a MC_Code mode.

as a result of the judgement of Step S11, if the MB_Mode is not the MC_Code mode, in Step S12, a counter corresponding to the mc_not_coded mode is increased, and if the MB_Mode is the MC_Code mode, a counter corresponding to the mc_coded mode is increased in Step S13. In Step S14, it is judged whether the MB is the last MB.

As a result of the judgement of Step S14, if the MB is not the last MB, a counter corresponding to the TotMBs is increased, and the steps S11 through S14 are repeatedly performed, If the MB is the last MB, a frequency (MC_Coded_Ratio) of the MC_coded mode and a frequency (MC_Not_Ratio) of the Not_coded mode are obtained based on the following Equation 2 in Step S16.

[Equation 2]

$$MC\_Coded\_Ratio = mc\_coded/mc$$

$$MC\_Not\_Coded\_ratio = mc\_not\_coded/mc$$

The MC_Coded_Ratio represents a motion information which is used for a comparison search of a motion image compressed differently in the f_code in accordance with a coding environment variation. If there are different compressed moving picture data having the f_code of 1 and 2, the region of the MC_Coded_Ratio of the moving picture in which the f_code is 1 may correspond to the Coded or Not-coded region of the f_code region at a high ratio. Therefore, the above-described MC_Coded_Ratio may be used for a search of the moving picture in which the f_codes are different.

In the present invention, the motion activity is classified into three steps (no movement, a small movement, and a lot amount movement), and the ratios with respect there to are indexed, and a video search is performed using the same. As shown in Table 5, the moving picture of the video is formed of a video name, a time stamp, a MC_Coded_Ratio and MC_Not_coded_Ratio. In addition, a plurality of time stamps and motion feature information may be used with respect to the same video. In the above-described case, the video_name_N may have the same names at the video_name_1 which is the list of the video name.

TABLE 5

| VIDEO NAME | TIME STAMP | MOTION FEATURE |
|---|---|---|
| video name_1 | start_time_1, end_time_1 | MC_Coded_Ratio_1, MC_Not_Coded_Ratio_1 |
| ... | ... | ... |
| video name_N | start_Time_N, end_time_N | MC_Coded_Ratio_N, MC_Not_Coded_Ratio_N |

In the motion feature information as shown in Table 5, it is possible to express with respect to a sheet of an image or an image of a certain interval; and it is possible to classify whether the information corresponds to a certain information with respect to a sheet of an image or the entire portion based on a time stamp.

Figure 6:
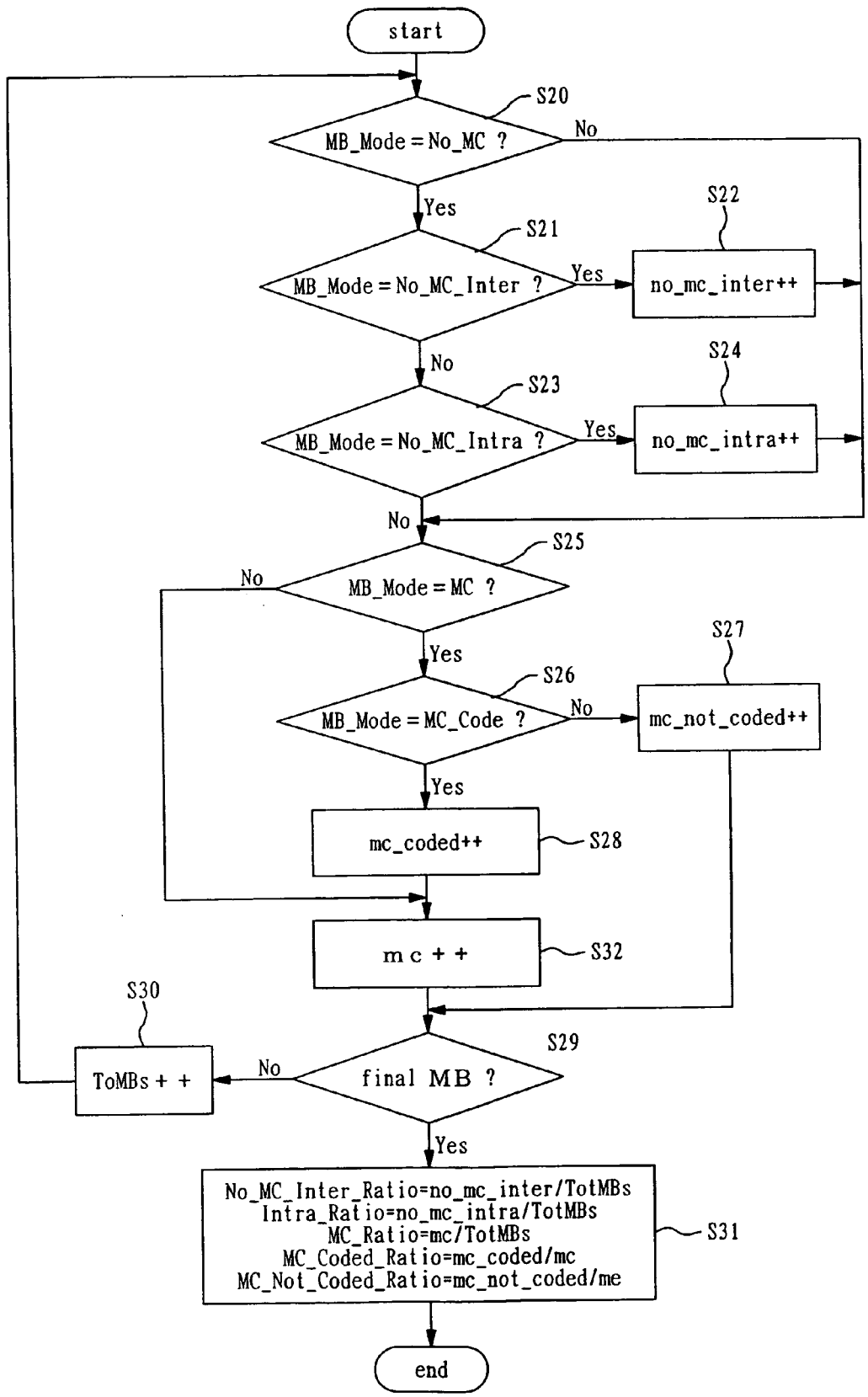
FIG. 6 is a flow chart illustrating a motion activity description method using a coding mode of a macro block according to a fourth embodiment of the present invention.

As shown in FIG. 6, a motion activity describing method using a coding mode of a macro block according to a fourth embodiment of the present invention will be explained.

In the MB_Mode, a frequency (No_MC_Inter_Ratio) of an Inter mode of No_MC, a frequency (Intra_Ratio) of an Intra mode of No_MC, a frequency (MC_Ratio) with respect to an MC mode, a frequency (MC_Coded_Ratio) of a coded mode with respect to the MC mode of the MB_Mode and a frequency (MC_Not_Coded_Ratio) of the Not_Coded mode are used as a motion feature information.

As shown in FIG. 6, in Step S21, the MB_Mode is judged to be the No_MC_inter mode.

As a result of the judgement of Step S21, if the MB_Mode is the No_MC_Inter mode, in Step S22, a counter corresponding to the no_mc_inter mode is increased, and if the MB_Mode is not the No_MC_Inter mode, in Step S23, the MB_Mode is judged to be the No_MC Intra mode.

As a result of the judgement of Step S23, if the MB_Mode is the No_MC_Intra mode, in Step S24, a counter corresponding to the no_mc_intra mode is increased, and if the MB_Mode is not the No_MC_Intra mode, a counter corresponding to the mc mode is increased. In Step S26, it is judged whether the MB_Mode is the MC_Code mode.

As a result of the judgement of Step S26, if the MB_Mode is not the MC_Code mode, in Step S27, a counter corresponding to the mc_not_coded mode is increased, and if the MB_Mode is the MC_Code mode, in Step S28, a counter corresponding to the mc_coded mode is increased. In Step S29, the MB is judged to be the last MB.

As a result of the judgement of Step S29, if the MB is not the last MB, a counter corresponding to the TotMBs is increased, and the steps S21 through S29 are repeatedly performed. If the MB is the last MB, in Step S31, a frequency (No_MC_Inter_Ratio) of the Inter mode of the No_MC, a frequency (Intra_Ratio) of the Intra mode of No_MC, a frequency (MC_Ratio) with respect to the MC mode, a frequency (MC_Coded_Ratio) of the MC_Coded mode and a frequency (MC_Not_coded_Ratio) of the Not_Coded mode are obtained.

[Equation 3]

$$No\_MC\_Inter\_Ratio = no\_mc\_inter/TotMBs$$

$$Intra\_Ratio = no\_mc\_intra/TotMBs$$

$$MC\_Ratio = mc/TotMBs$$

$$MC\_Coded\_Ratio = mc\_coded/mc$$

$$MC\_Not\_Coded\_Ratio = mc\_not\_coded/mc$$

where TotMBs represents the number of the module macro blocks used for a motion extraction at a section employed for obtaining a motion feature.

In the present invention, the motion activity is classified into three steps (no movement, a small movement, and a lot amount movement), and the ratios with respect there to are indexed, and a video search is performed using the same.

As shown in Table 6, the motion feature information of the video is formed of a video name, a time stamp, No_MC_Inter_Ratio, Intra_Ratio, MC_Ratio, MC_Coded_Ratio and MC_Not_Coded_Ratio. In addition, a plurality of time stamps and motion feature information may be provided with respect to the same video. In this case, the video_name_N has the same name at the video_name_1 which is the list of the video name.

TABLE 6

| VIDEO NAME | TIME STAMP | MOTION FEATURE |
|---|---|---|
| video name_1 | start_time_1, end_time_1 | No_MC_Inter_Ratio_1, Intra_Ratio_1, MC_Ratio_1, MC_Coded_Ratio_1, MC_Not_Coded_Ratio_1 |
| ... | ... | ... |
| video name_N | start_time_N, end_time_N | No_MC_Inter_Ratio_N, Intra_Ratio_N, MC_Ratio_N, MC_Coded_Ratio_N, MC_Not_Coded_Ratio_N |

As shown in Table 6, the motion feature information may be expressed with respect to a sheet of an image and an image of a certain interval. It is possible to recognize whether the information corresponds to a feature information with respect to a sheet of an image or a certain interval or the entire interval based on the time stamp.

Figure 7:
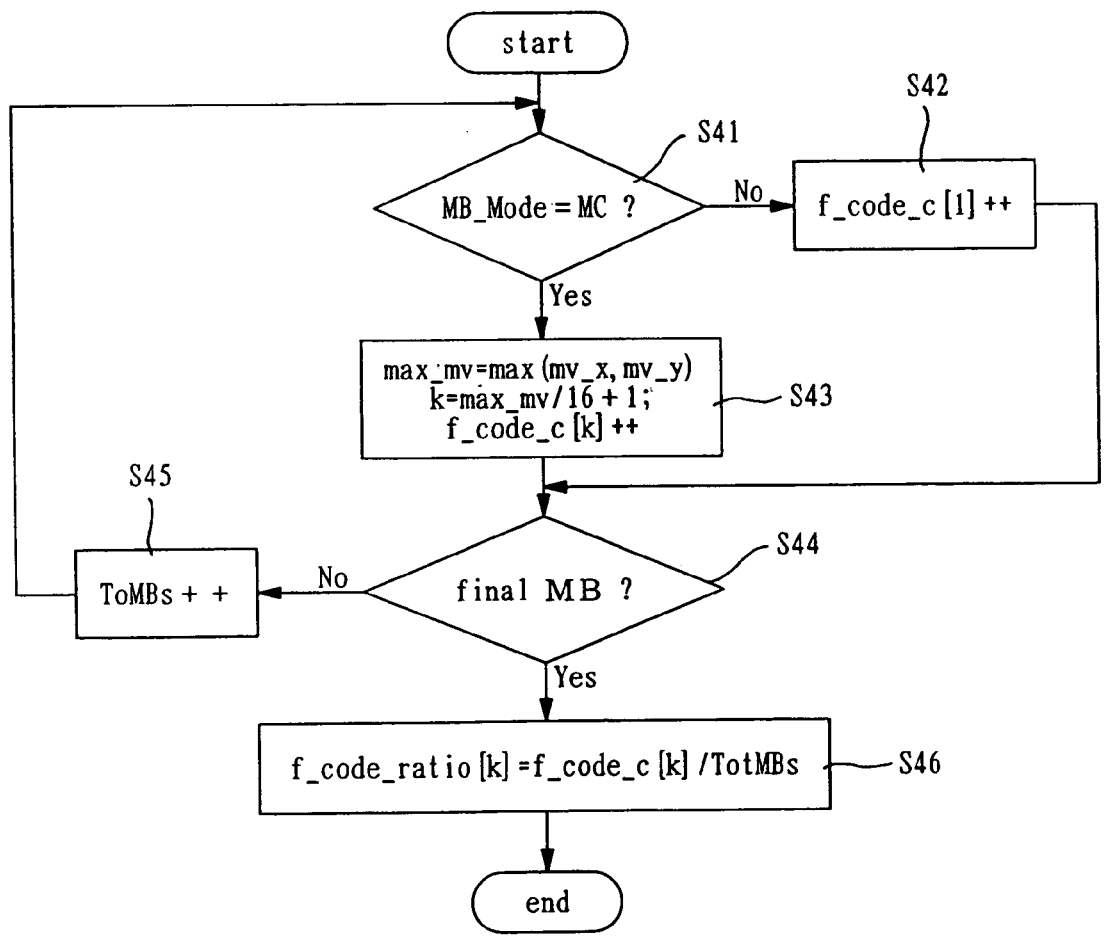
FIG. 7 is a flow chart illustrating a motion activity description method using a coding mode of a macro block according to a fifth embodiment of the present invention.

As shown in FIG. 7, the motion activity describing method using a coding mode of a macro block according to a fifth embodiment of the present invention will be explained.

A frequency (f_code_ratio, f_code_ratio_N) is used as a motion feature based on a motion occurrence range for each f_code of Table 1 with respect to the motion vector MV of the MB having the NoT_Coded, Coded mode or No_MC_Inter mode of the MC mode of the MB_Mode.

As shown in FIG. 7, in Step S41, the MB_Mode is judged to be the MC_Mode.

As a result of the judgement, if the MB_Mode is the MC_Mode, in Step S42, a counter of f_code 1 is increased in Step S42. The motion activity is classified in the same manner as the f_code index, and the frequency for each index is featured. For example, MV=(10, 10), f_code may be expressed as 1, and a counter (f_code_c[1] of the f_code 1 is increased, and if MV (20, 10), it may be expressed when the f_code is 2, so that the counter (f_code_c[1]) of the f_code 2 is increased.

As a result of the judgement of Step S41, if the MB_Mode is the MC_Mode, in Step S43, the largest X-axis motion vector mv_x and the largest Y-axis motion vector mv_y are selected as the largest motion vector max_mv, and the maximum value k of the f_code is obtained based on the selected max_mv/16, and the counter value of the largest f_code is increased, and in Step S44, the MB is judged to be the last MB.

As a result of the judgement of Step S44, if the MB is not the last MB, the counter of the TotMBs is increased, and the steps S41 through S44 are repeatedly performed, and if the MB is the last MB, the f_code_ratio is obtained based on the following equation 4.

[Equation 4]

$$f\_code\_ratio[k] = f\_code\_c[k]TotMBs$$

The extraction motion feature information is described based on the motion feature information which is expressed as a video name, a time stamp and a f_code_ratio as shown in Table 7.

TABLE 7

| VIDEO NAME | TIME STAMP | MOTION FEATURE |
|---|---|---|
| video name_1 | start_time_1, end_time_1 | f_code_ratio_1[1]. . . . f_code_ratio_1[k] |
| . . . | . . . | . . . |
| video name_N | start_time, end_time_N | f_code_ratio_N[1], f_code_ratio_N[k] |

Figure 8:
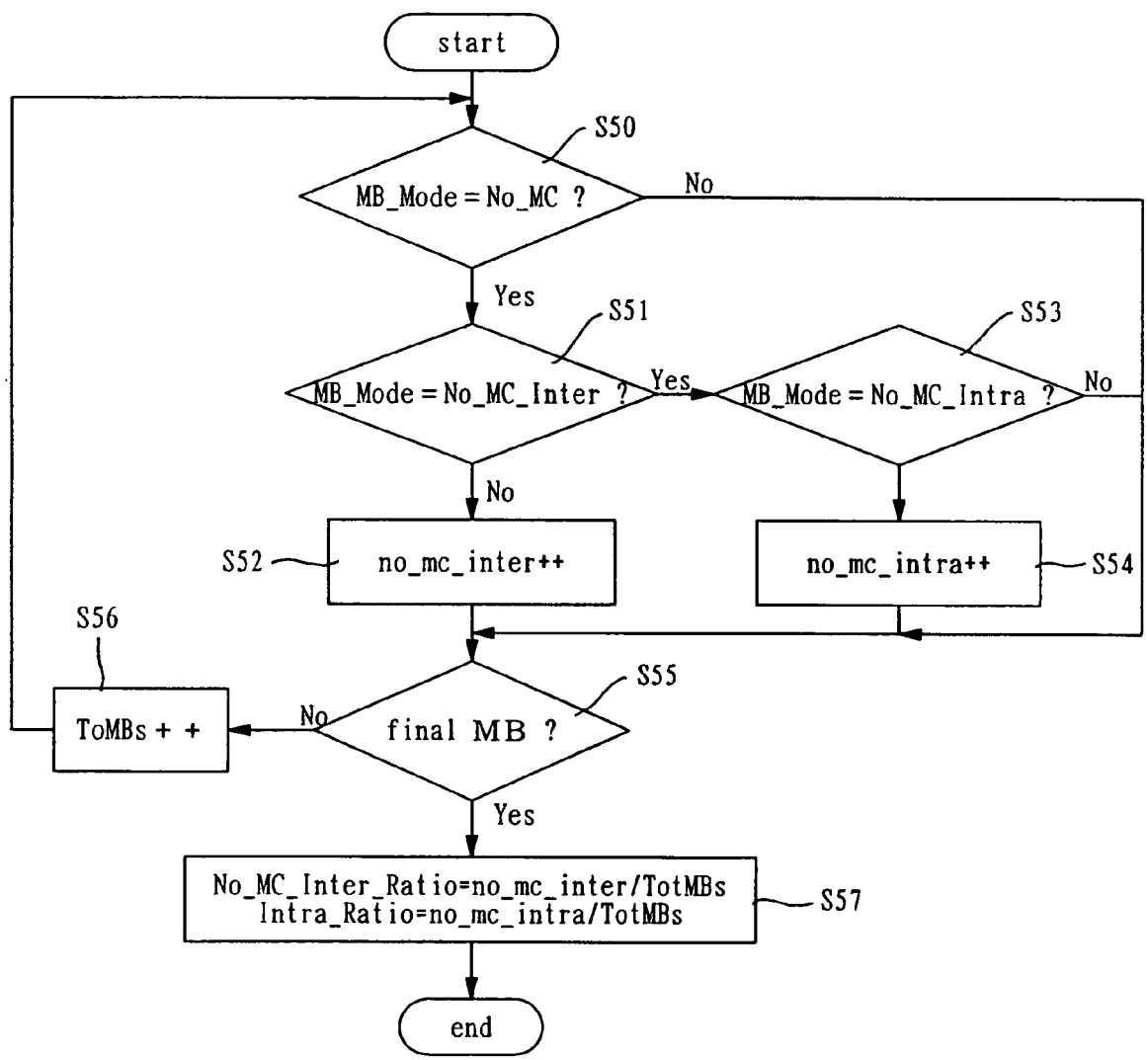
FIG. 8 is a flow chart illustrating a motion activity description method using a coding mode of a macro block according to a sixth embodiment of the present invention.

As shown in FIG. 8, the motion activity describing method using a coding mode of a macro block according to a sixth embodiment of the present invention will be explained.

In the MB_Mode, a frequency (No_MC_Inter_Ratio) of the MB with respect to the Inter mode of the No_MC and a frequency (Intra_Ratio) of the MB with respect to the Intra mode of the No_MC are used as a motion feature.

Since the No_MC_Inter_Ratio represents a ratio with respect to the region which is not moved in the video, it may be used for indexing and searching the still picture or the moving picture. The Intra_Ratio may be used for indexing and searching a picture which is fast moved at a ratio that a new object appears.

As shown in FIG. 8, in Step S51, the MB_Mode is judged to be the no_MC_inter mode.

As a result of the judgement of Step S51, if the MB_Mode is the No_MC_Inter mode, in Step S52, a counter corresponding to the no_inter mode is increased, and if the MB_Mode is not the no_MC_Inter mode, in step S53, the MB_Mode is judged to be the No_MC_Intra mode.

As a result of the judgement of Step S53, if the MB_Mode is the No_MC_Intra mode, in Step S54, a counter corresponding to the no_mc_intra mode is increased, and if the MB_Mode is not the No_MC_Intra mode, all routines are stopped.

After the steps S52 and S54 are performed, in Step S55, it is judged whether the MB is the last MB.

As a result of the judgement of Step S55, if the MB is not the last MB, a counter corresponding to the TotMBs is increased, and the steps S51 through S55 are repeatedly performed. If the MB is the last MB, a frequency (No_MC_Ratio) of the Inter mode of the No_MC and a frequency (Intra_Ratio) of the Intra mode of the no_MC are obtained based on the following Equation 5 in Step S57.

[Equation 5]

$$No\_MC\_Inter\_Ratio = no\!=\!mc\!=\!inter/TotMBs$$

$$Intra\_Ratio = no\_mc\_intra/TotMBs$$

where TotMBs represents the number of the module macro blocks used for a motion extraction at an interval for obtaining a motion feature.

The thusly extracted motion feature information is described as a motion feature information which is expressed as a video name, a time stamp, a No_MC_Inter_Ratio and an Intra_Ratio as shown in Table 8.

TABLE 8

| VIDEO NAME | TIME STAMP | MOTION FEATURE |
|---|---|---|
| video name_1 | start_time_1, end_time_1 | no_MC_Inter_Ratio_1, Intra_Ratio_1, Mc_Ratio_1 |
| . . . | . . . | . . . |
| video name_N | start_time_N, end_time_N | No_MC_Inter_ratio_1, Intra_Ratio_1, MC_Ratio_1 |

As described above, the present invention may be used for a multimedia database and search system for describing a motion feature with respect to a moving picture data.

In addition, the present invention may be adapted to effectively extract/describe/search a feature with respect to a real time motion information of a moving picture of a large capacity in real time based on an existing moving picture decoder.

Although the preferred embodiment of the present invention have been disclosed for illustrative purposes, those skilled in the art will appreciate that various modifications, additions and substitutions are possible, without departing from the scope and spirit of the invention as recited in the accompanying claims.

What is claimed is:

1. A moving picture indexing and searching method using a motion activity describing method, comprising the steps of:
   describing a motion feature information in terms of a video name, a time stamp and an f-code which is a motion feature range; and
   indexing and searching a moving picture using said motion feature information.

2. The method of claim 1, wherein said video name has a plurality of time stamps and a f_code.

3. A moving picture indexing and searching method using a motion activity describing method, comprising the steps of:

describing a motion feature information in terms of a video name and a time stamp, and a frequency of an Inter mode of No_MC, a frequency of an Intra mode of No_MC and a frequency of an MC mode obtained by a selected process; and indexing and searching a moving picture using said motion feature information.

4. The method of claim 3, wherein said video name has a plurality of time stamps, a frequency of an Inter mode of a No_MC, a frequency of an Intra mode of a No_MC, and a frequency of an MC mode.

5. The method of claim 3, wherein said selected process comprises:

a first step of determining whether an MB_Mode is a No_MC mode;

a second step of determining whether MB_Mode is No_MC_inter mode, if MB_Mode is determined as No_MC mode in said first step;

a third step of increasing counting value (no_mc_inter) of a counter for counting a frequency of No_MC_Inter mode and determining whether a current MB is a last MB, if MB_Mode is determined as No_MC_Inter mode in said second step, and determining whether MB_Mode is No_MC_Intra mode if MB_Mode is not determined as No_MC_Inter mode;

a fourth step of increasing counting value (no_mc_intra) of a counter for counting a frequency of No_MC_Intra mode and determining whether a current MB is a last MB, if MB_Mode is determined as No_MC_Intra mode in said third step, and increasing counting value (mc) of a counter for counting a frequency of MC mode and determining whether a current MB is a last MB, if MB_Mode is not determined as No_MC mode in said third step; and a fifth step of increasing number of macro blocks (TotMBs) used in a motion feature range and repeatedly performing said first to third steps if said current MB is not determined as a last MB in said fourth step, and if said current MB is determined as a last MB in said fourth step, obtaining a frequency (No_MC_Inter_Ratio) of Inter mode of No_MC, frequency (Intra_Ratio) of Intra mode of No_MC according to the following Equations:

$No\_MC\_Inter\_Ratio=no\_mc\_inter/TotMBs$ $Intra\_Ratio=no\_mc\_intra/TotMBs$ $MC\_Ratio=mc/TotMBs.$ 6. A moving picture indexing and searching method using a motion activity describing technique, comprising the steps of:

describing a motion feature information based on a video name, a time stamp and a frequency of an Inter mode of a No_MC obtained by a selected process; and indexing and searching a moving picture using said motion feature information.

7. The method of claim 6, wherein said video name has a plurality of time stamps and a frequency of an Inter mode of an No_MC.

8. The method of claim 6, wherein said selected process comprises:

a first step of increasing counting value (mc_nc_inter) of a counter for counting a frequency of No_MC_Inter mode and determining whether a current MB is a last MB if said MB_Mode is No_MC mode and No_MC_Inter mode; and a second step of increasing number of macroblocks (TotMBs) used in a motion feature range and repeatedly performing said first step if said current MB is not determined as a last MB in said first step, and if said current MB is the last MB, obtaining a frequency (No_MC_Inter_Ratio) of Inter mode of No_MC according to the following Equation:

$No\_MC\_Inter\_Ratio=no\_mc\_inter/TotMBs.$

9. A moving picture indexing and searching method using a motion activity describing technique, comprising the steps of:

describing a motion feature information based on a video name, a time stamp and a frequency of an Intra mode of a No_MC obtained by a selected process; and indexing and searching a moving picture using said motion feature information.

10. The method of claim 9, wherein said video name has a plurality of name information and a frequency of Intra mode of a No_MC.

11. The method of claim 9, wherein said selected process comprises:

a first step of increasing counting value(mc_nc_intra) of a counter for counting a frequency of No_MC_Intra mode and determining whether a current MB is a last MB if said MB_Mode is No_MC mode and No_MC_Intra mode; and a second step of increasing number of macro blocks (TotMBs) used in a motion feature range and repeatedly performing said first step if said current MB is not determined as a last MB in said first step, and if said current MB is the last MB, obtaining frequency (Intra_Ratio) of Intra mode of No_MC according to the following Equation:

$Intra\_Ratio=no\_mc\_intra/TotMBs.$

12. A moving picture indexing and searching method using a motion activity describing technique, comprising the steps of:

describing a motion feature information based on a video name, a time stamp and a frequency of an MC mode obtained by a selected process; and indexing and searching a moving picture using said motion feature information.

13. The method of claim 12, wherein said video name has a frequency of a plurality of time stamps and a frequency of an MC mode.

14. The method of claim 12, wherein said selected process comprises:

a first step of increasing counting value(mc) of a counter for counting a frequency of MC mode and determining whether a current MB is a last MB if said MB_Mode is not No_MC mode; and a second step of increasing number of macro blocks (TotMBs) used in a motion feature range and repeatedly performing said first step if said current MB is not determined as a last MB in said first step, and if said current MB is the last MB, obtaining a frequency (MC_Ratio) with respect to MC mode according to the following Equation:

$MC\_Ratio=mc/TotMBs.$

15. A moving picture indexing and searching method using a motion activity describing technique, comprising the steps of:

describing a feature information based on a video name and a time stamp and a frequency of an MC_Coded mode and a frequency of an MC_Not_Coded mode obtained by a selected process; and indexing and searching a moving picture using said feature information.

16. The method of claim 15, wherein said video name has a plurality of time stamps, a frequency of an MC_coded mode and a frequency of an MC_Not_Coded mode.

17. The method of claim 15, wherein said selected process comprises:
a first step of determining whether MB_Mode is MC mode;
a second step of determining whether MB_Mode is MC_Coded mode, if said MB_Mode is determined as MC mode in said first step;
a third step of determining whether a current MB is a last MB by increasing counting value (mc_not_coded) of a counter for counting a frequency of MC_Not_Coded mode, if said MB_Mode is not determined as MC_Coded mode in said second step, and increasing counting value (mc_coded) of a counter for counting a frequency of MC_Coded mode and further increasing counting value(mc) of a counter for counting a frequency of MC mode;
a fourth step of increasing number of macro blocks (TotMBs) used in a motion feature range and repeatedly performing said first to third steps if said current MB is determined as not a last MB in said third step, and if said current MB is the last MB, obtaining a frequency (MC_Coded_Ratio) of the MC_Coded mode and a frequency (MC_Not_Coded_Ratio) of the Not_Coded mode according to the following Equations:

$MC\_Coded\_Ratio=mc\_coded/mc$ $MC\_Not\_Coded\_Ratio=mc\_not\_coded/mc.$

18. A moving picture indexing and searching method using a motion activity technique, comprising the steps of:
describing a feature information based on a video name, a time stamp and a frequency of an MC_Coded mode and a frequency of an MC_Not_Coded mode; and
measuring a similarity by comparing the frequency of MC_Coded mode of a moving picture of a smaller f_code with the frequency of MC_Coded mode of a larger f_code or with the frequency of MC_Not_Coded mode with respect to a moving picture having different f_codes, and indexing and searching a moving picture using said feature information.

19. The method of claim 18, wherein said video name has a plurality of time stamps, a frequency of MC_Coded mode and a frequency of MC_Not_Coded mode.

20. The method of claim 18, wherein said selected process comprises:
a first step of determining whether MB_Mode is MC mode;
a second step of determining whether said MB_Mode is MC_Coded mode, if said MB_Mode is determined as MC mode in said first step;
a third step of increasing counting value (mc_not_coded) of a counter for counting a frequency of MC_Not_Coded mode if said MB_Mode is not determined as MC_Coded mode in said second step, and increasing counting value (mc_coded) of a counter for counting a frequency of MC_Coded mode, increasing counting value(mc) of a counter for counting MC mode, and determining whether a current MB is a last MB if said MB_Mode is determined as MC_Coded mode in said second step; and
a fourth step of increasing number of macro blocks (TotMBs) used in a motion feature range and repeatedly performing said first to third steps if said current MB is not determined as a last MB in said third step, and if said MB is determined as a last MB in said third step, obtaining a frequency (MC_Coded_Ratio) of MC_Coded mode and a frequency (MC_Not_Coded_Ratio) of Not_Coded mode according to the following $MC\_Coded\_Ratio=mc\_coded/mc$ $MC\_Not\_Coded\_Ratio=mc\_not\_coded/mc.$ 21. A moving picture indexing and searching method using a motion activity describing technique, comprising the steps of:
describing a motion feature information in terms of a video name, a time stamp and a frequency of Inter mode of No_MC obtained by a selected process, a frequency of Intra mode of said No_MC, a frequency of MC mode, a frequency of a Coded mode with respect to MC mode and a frequency of Not_Coded mode with respect to MC mode; and
indexing and searching a moving picture using said motion feature information.

22. The method of claim 21, wherein said video name has a frequency of a plurality of time stamps, a frequency of Inter mode of No_MC, a frequency of Intra mode of No_MC, a frequency of MC mode, a frequency of Coded mode with respect to Inter mode, a frequency of MC mode, a frequency of Coded mode with respect to MC mode, and a frequency of Not_Coded mode with respect to MC mode.

23. The method of claim 21, wherein said selected process comprises:
a first step of determining whether MB_Mode is No_MC mode;
a second step of determining whether said MB_Mode is No_MC inter mode, if said MB_Mode is determined as No_MC mode in said first step;
a third step of increasing counting value (no_mc_inter) of a counter for counting a frequency of No_MC_Inter mode if said MB_Mode is determined as No_MC_Inter mode in said second step, and determining whether MB_Mode is No_MC_Intra mode if said MB_Mode is not determined as No_MC_Inter mode in said second step;
a fourth step of increasing counting value(no_mc_intra) of a counter for counting a frequency of No_MC_Intra mode if said MB_Mode is determined as No_MC_Intra mode in said third step, and determining whether MB_Mode is MC mode if said MB_Mode is not determined as No_MC_Intra mode;
a fifth step of determining whether said MB_Mode is MC_Coded mode if said MB_Mode is determined as MC mode in said fourth step;
a sixth step of increasing counting value (mc_not_coded) of a counter for counting a frequency of MC_Not_Coded mode if said MB_Mode is not determined as MC_Coded mode in said fifth step, and increasing counting value (mc_coded) of a counter for counting a frequency of MC_Coded mode, increasing counting value (mc) of a counter for counting a frequency of MC mode, and determining whether a current MB is a 1 st MB if said MB_Mode is determined as MC_Coded mode in said fifth step; and a seventh step of increasing number of macro blocks (TotMBs) used in a motion feature range and repeatedly performing said first to sixth steps if said current MB is not determined as a last MB in said sixth step, and if said MB is determined as a last MB in said sixth step, obtaining a frequency (No_MC_Inter_Ratio) of Inter mode of No_MC, a frequency(Intra_Ratio) of Intra mode of No_MC, a frequency (MC_Ratio) with respect to MC mode, a frequency(MC_Coded_Ratio) of MC_Coded mode, and a frequency (MC_Not_Coded_Ratio) of Not_Coded mode according to the following Equations:

$$No\_MC\_Inter\_Ratio = no\_mc\_inter/TotMBs$$

$$Intra\_Ratio = no\_mc\_intra/totMBs$$

$$MC\_Ratio = mc/TotMBs$$

$$MC\_Coded\_Ratio = mc\_coded/mc$$

$$MC\_Not\_Coded\_Ratio = mc\_not\_coded/mc.$$

24. A moving picture indexing and searching method using a motion activity describing technique, comprising the steps of:

classifying a motion vector of a macro block having a video name, time stamp, MC_Not_Coded mode, MC_Coded mode and No_MC_Inter mode in accordance with f_code, describing in terms of f_code frequency obtained by a selected process, measuring a similarity by comparing each f_code frequency, and indexing and searching a moving picture using said motion feature information.

25. The method of claim 24, wherein said selected step comprises:

a first step of determining whether the MB_Mode is an MC_Mode;

a second step of increasing a counting value (f_code_c[1]) of a counter of f_code 1 and determining whether a current MB is a last MB if the MB_Mode is determined as Inter mode of No_MC mode;

a third step of selecting the largest X-axis motion vector (mv_x) and the largest Y-axis motion vector (mv_y) as a largest motion vector (max_mv), obtaining a maximum value k of f_code by the selected max_mv/16, increasing the counting value (f_code_c[k]) of the obtained f_counter, and determining whether a current MB is the last MB if MB_Mode is determined as MC_Mode in said first step; and a fourth step of increasing a number of macro block used in a motion feature range, repeatedly performing said first to third steps, and if a current MB is the last MB, obtaining a frequency of f_code according to the following Equation:

$$f\_code\_ratio[k] = f\_code\_c[k]TotMBs.$$

26. A moving picture indexing and searching method using a motion activity describing technique, comprising the steps of:

classifying a motion vector of a macro block having a video name, time stamp, MC_Not_Coded mode, MC_Coded mode and No_MC_Inter mode in accordance with f_code, describing in terms of f_code frequency obtained by a selected process, measuring a similarity by comparing each f_code frequency with an at least one adjacent f_code frequency, and indexing and searching a moving picture using said motion feature information.

27. The method of claim 26, wherein said selected step comprises:

a first step of determining whether the MB_Mode is an MC_Mode;

a second step of increasing a counting value (f_code_c[1]) of a counter of f_code 1 and determining whether a current MB is a last MB if the MB_Mode is determined as Inter mode of No_MC mode;

a third step of selecting the largest X-axis motion vector (mv_x) and the largest Y-axis motion vector (mv_y) as a largest motion vector(max_mv), obtaining a maximum value k of f_code by the selected max_mv/16, increasing the counting value (f_code_c[k]) of the obtained f_counter, and determining whether a current MB is the last MB if MB_Mode is determined as MC_Mode in said first step; and a fourth step of increasing a number of macro block used in a motion feature range, repeatedly performing said first to third steps, and if a current MB is not determined as a last MB in said second and third steps, obtaining a frequency of f_code according to the following Equation:

$$f\_code\_ratio[k] = f\_code\_c[k]/TotMBs.$$

28. A moving picture indexing and searching method using a motion activity describing technique, comprising the steps of:

classifying a motion vector of a macro block having a video name, time stamp, MC_Not_Coded mode, MC_Coded mode and No_MC_Inter mode in accordance with f_code, describing in terms of f_code frequency obtained by a selected process, measuring a similarity by comparing each f_code frequency with an at least one adjacent f_code frequency, said comparison is performed in such a manner that said similarity is larger when said motion vector is closer to a maximum value and a minimum value of a vector range described by each f_code and a reproduced motion compensation error is larger, and a weighted value is added to a frequency of f_code larger than the releant f_code, and indexing and searching a moving picture using said f_code frequency.

29. The method of claim 28, wherein said selected step comprises:

a first step of determining whether the MB_Mode is an MC_Mode;

a second step of increasing a counting value (f_code_c[1]) of a counter of f_code 1 and determining whether a current MB is a last MB if the MB_Mode is determined as Inter mode of No_MC mode in said first step;

a third step of selecting the largest X-axis motion vector (mv_x) and the largest Y-axis motion vector (mv_y) as a largest motion vector (max_mv), obtaining a maximum value k of f_code by the selected max_mv/16, increasing the counting value (f_code_c[k]) of the obtained f_counter, and determining whether a current MB is the last MB if MB_Mode is determined as MC_Mode in said first step; and a fourth step of increasing a number of macro blocks used in a motion feature range and repeatedly performing said first to third steps, and if the current MB is determined as a last MB in said second and third steps, obtaining a frequency of f_code according to the following Equation:

$$f\_code\_ratio[k] = f\_code\_c[k]/TotMBs.$$

30. A moving picture indexing and searching method using a motion activity describing technique, comprising the steps of:
- describing a feature information in terms of a video name and a time stamp and a frequency of Inter mode of No_MC and a frequency of Intra mode of No_MC obtained by a selected process; and indexing and searching a moving picture using said feature information.

31. The method of claim 30, wherein said selected process comprises:
- a first step of determining whether MC_Mode is No_MC mode;
- a second step of determining whether said MB_Mode is No_MC_inter mode, if said MC_Mode is determined as No_MC mode in said first step;
- a third step of increasing counting value (no_mc_inter) of a counter for counting a frequency of No_MC_Inter mode if said MB_Mode is determined as No_MC_Inter mode and determining whether a current MB is a last MB in said second step, and determining whether MB_Mode is No_MC_Intra mode if said MB_Mode is not determined as No_MC_Inter mode in said second step;
- a fourth step of increasing counting value (no_mc_intra) of a counter for counting a frequency of No_MC_Intra mode if said MB_Mode is determined as No_MC_Intra mode in said third step, and determining whether a current MB is a last MB if said MB_Mode is not determined as No_MC_Intra mode; and
- a fifth step of increasing number of macro blocks (TotMBs) used in a motion feature range and repeatedly performing said first to fourth steps if said current MB is not determined as a last MB in said third and fourth steps, and if said MB is determined as a last MB in said fourth step, obtaining a frequency (No_MC_Inter_Ratio) of Inter mode of No_MC and a frequency (No_MC_Intra_Ratio) of Intra mode of No_MC according to the following Equations:

$$No\_MC\_Inter\_Ratio = no\_mc\_inter/TotMBs$$

$$Intra\_Ratio = no\_mc\_intra/TotMBs.$$

* * * * *